United States Patent [19]

Rommel

[11] 4,223,439
[45] Sep. 23, 1980

[54] MANUALLY OPERATED CUTTING PLIERS FOR CABLES, WIRES, PROFILES OR THE LIKE

[76] Inventor: Reiner Rommel, Moldaustrasse 6, 3570 Stadt Allendorf, Fed. Rep. of Germany

[21] Appl. No.: 2,291

[22] Filed: Jan. 10, 1979

[30] Foreign Application Priority Data

Jul. 25, 1978 [DE] Fed. Rep. of Germany ....... 2832561

[51] Int. Cl.³ ............................................. B26B 13/16
[52] U.S. Cl. ...................................... 30/250; 30/253
[58] Field of Search ................ 30/134, 192, 229, 249, 30/250, 252, 253

[56] References Cited

U.S. PATENT DOCUMENTS

| 1,454,917 | 5/1923 | Barrett | 30/249 |
| 3,885,309 | 5/1975 | Lund | 30/250 |
| 3,922,783 | 12/1975 | Hayes | 30/250 |
| 4,055,891 | 11/1977 | Wick | 30/250 |

Primary Examiner—Jimmy C. Peters
Attorney, Agent, or Firm—Max Fogiel

[57] ABSTRACT

Manually operated cutting pliers in which two hinged plier grips are spread apart by spring action. One of the plier grips has a fixture, whereas the other grip actuates a jaw movable relative to the fixed jaw by a sliding drive. At least one of the two jaws on a side facing the other, has a cutting edge. The two plier jaws can be enclosed around a workpiece to form a closed jaw arrangement with a width which can be reduced to substantially zero by opening and closing the two plier grips. The movable jaw may be pivotally mounted on the outer end of the fixed jaw and is formed by a clamp to be placed around the workpiece. During closure, the clamp engages the sliding drive, and when it is actuated, the workpiece is gradually pinched between the jaws and finally split.

9 Claims, 8 Drawing Figures

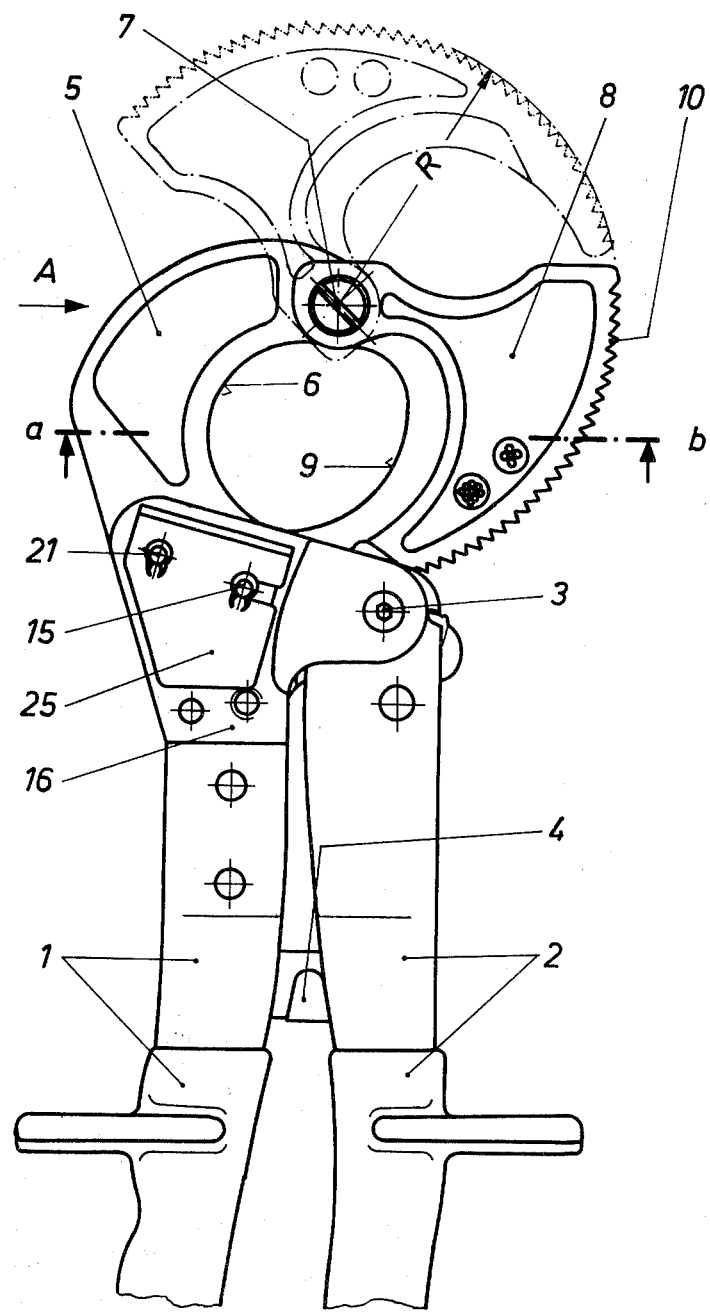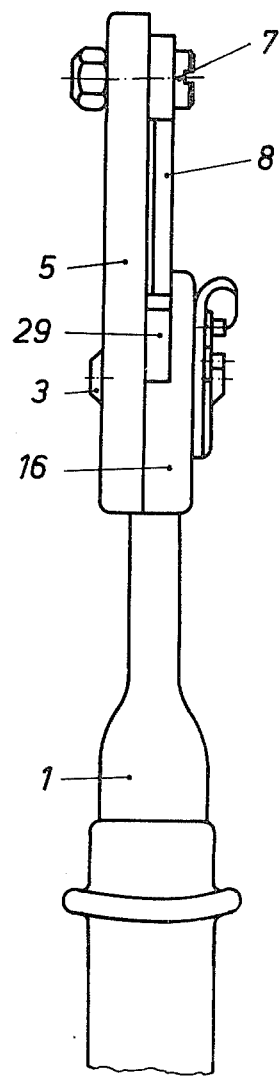

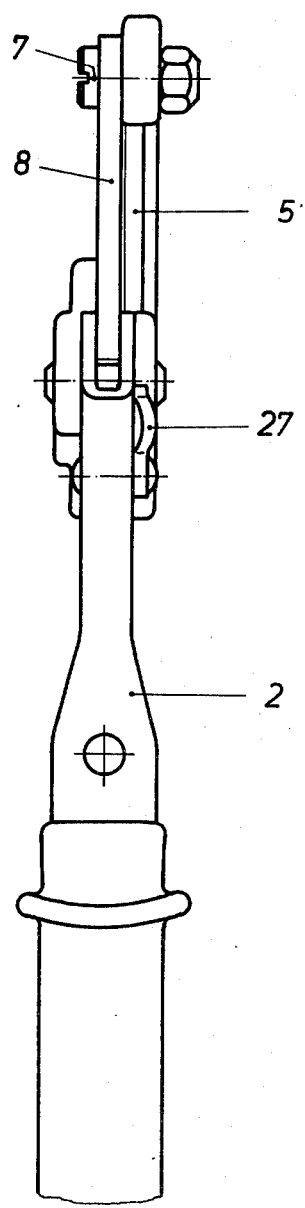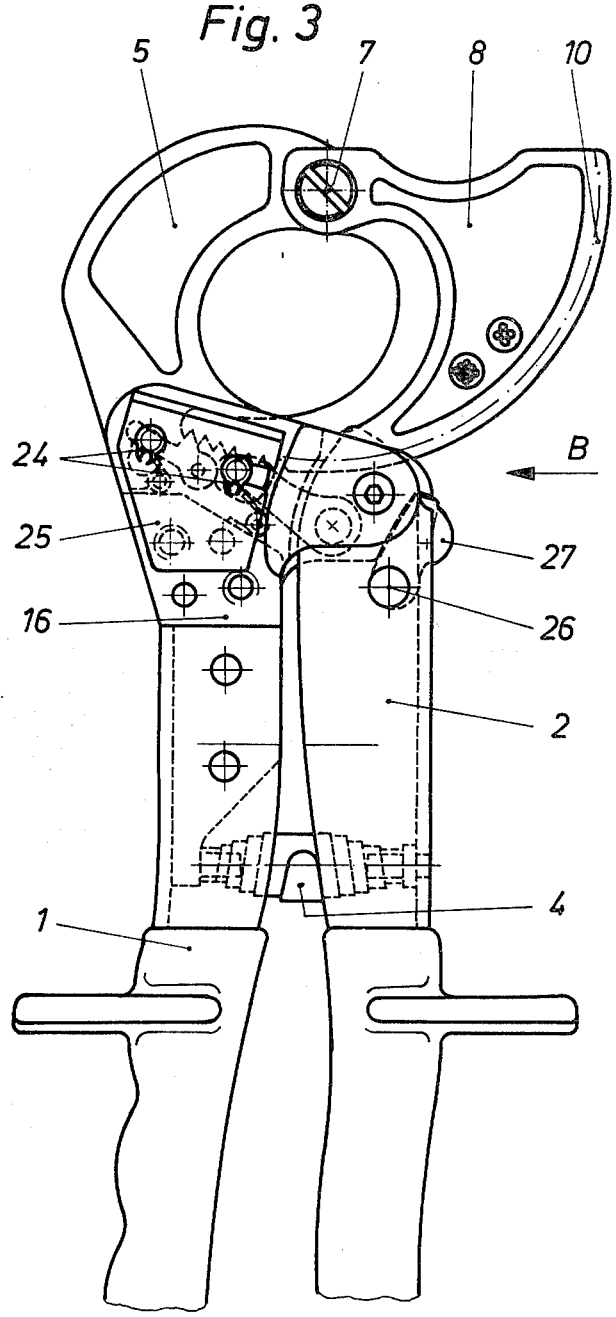

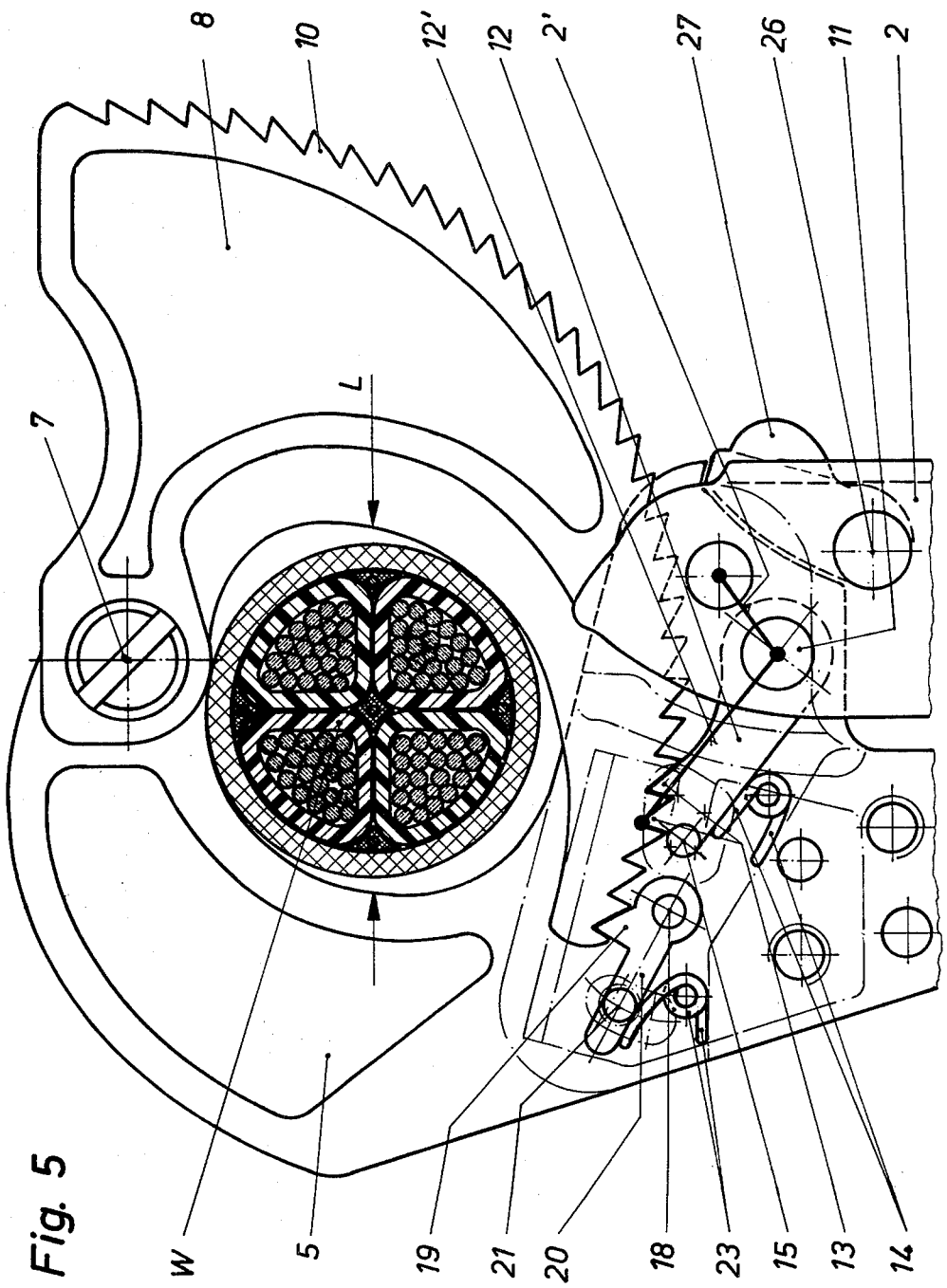

MANUALLY OPERATED CUTTING PLIERS FOR CABLES, WIRES, PROFILES OR THE LIKE

BACKGROUND OF THE INVENTION

The invention relates to manually operated cutting pliers for cables, wires, profiles and the like with two hinged plier grips spread apart by spring action, of which one is provided with a fixed jaw and the other actuates a jaw movable relative to the fixed jaw where at least one of the two jaws on the side facing the other has a cutting edge. Such pliers, known, for example, from Swiss Pat. No. 421,864, have a mouth open in the forward direction, which, depending on the thickness of the workpiece to be cut, opens more or less. The result is that in spite of the cutting jaws curved towards each other, the workpiece upon closing the pliers jumps out of its mouth (jaw arrangement) so that only relatively thin cables, wires, and the like, can be cut in practice.

It is the object of the invention to create a cutting pliers with which with little expenditure of force even the thickest cables, wires, profiles and the like can be securely cut without having to fear that the workpiece will jump from the pliers. This is achieved by the invention by the fact that the two plier jaws can be closed around the workpiece to form a jaw arrangement closed on all sides whose width can be reduced to zero by opening and closing the two plier grips. According to the invention, the movable jaw is pivotally mounted on the outer end, reaching around the workpiece, of the fixed jaw and is formed by a clamp to be placed around the workpiece which clamp during closure engages the sliding drive and during whose actuation the workpiece is gradually pinched between the jaws and finally split.

Preferably a slot guide for the movable jaw is provided at the fixed plier grip. The movable jaw on its outside has the form of a gear segment whose teeth are located on a circular arc centered around the pivot bearing, where the sliding drive cooperates with this gear tooth system.

A special advantage is provided in a known manner by constructing the pliers as a so-called shear-cutter where the two cutting jaws guide each other along plane surfaces, and the cutting phase is ground on the side facing away from the plane surface. The sliding drive is formed by a shear lever located at the movable plier grip (shear grip) and engaging the gear segment of the movable jaw (pivot knife) under spring action, and a stop lever located at the fixed plier grip (fixed grip) which lever, under spring action, engages the gear segment when the shear grip swings back.

So that the pliers can be actuated with minimum effort, the movable plier grip is located at a distance from the pivot bearing of the movable jaw corresponding to the radius of the tooth segment, on the fixed plier grip, while the shear lever together with the upper end of the movable plier grip forms a toggle lever drive cooperating with the gear segment. Finally, shear lever and stop lever are engaged to a common unlocking slide so that in any plier setting there is the possibility of releasing the pliers with a single manipulation.

The pliers in accordance with the invention are a hand tool operated with little effort which can be used for the cutting of cables, wires, ropes and profiles and for clipping branches and tree limbs, etc.

The inventive concept permits various embodiments. One of these is reproduced in the accompanying drawing.

FIG. 1 shows a top view of the pliers in accordance with the invention;

FIG. 2 shows a side view seen in the direction of arrow A;

FIG. 3 shows a view of the pliers similar to FIG. 1 with the sliding drive shown by broken lines;

FIG. 4 shows a side view, seen in the direction of arrow B;

FIG. 5 shows a top view of the plier head on an enlarged scale, with a workpiece to be cut held therein;

Figure 6:
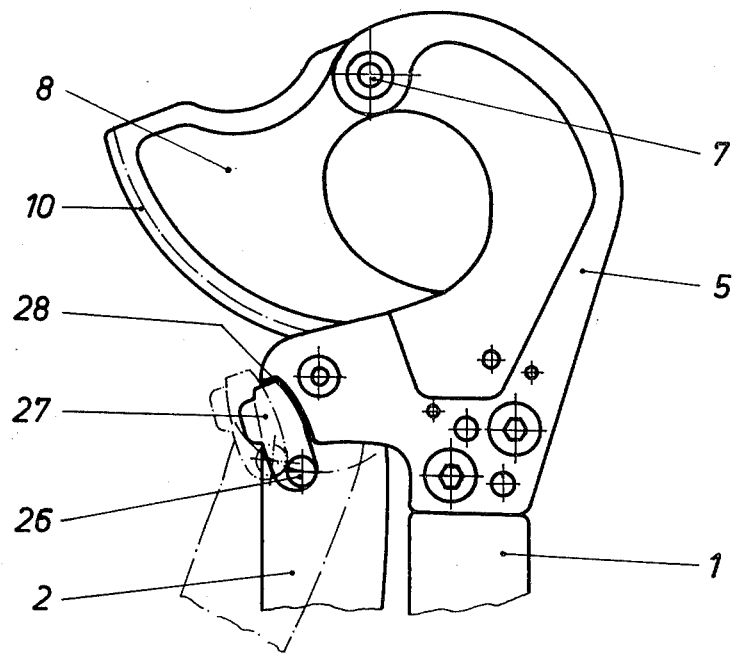
FIG. 6 shows a rear view of the plier head with the locking pawl.

The pliers have two plier grips, the fixed grip 1 and the shear grip 2 both of which are pivotally joined via the connecting bolt 3. A wound leaf spring 4 located between the two plier grips tends to push the plier grips to the open position where both grips 1 and 2 are spread apart.

Figure 7:
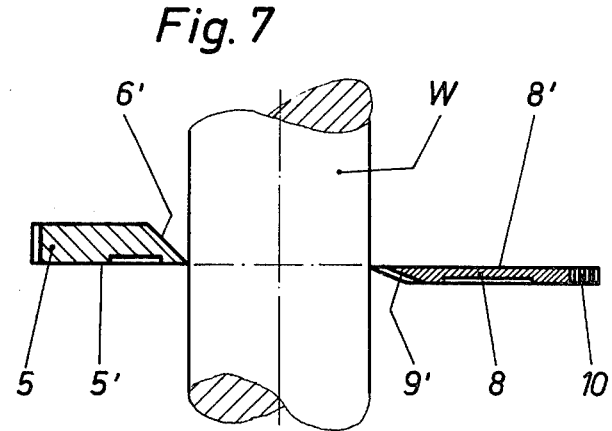
FIG. 7 shows a section along lines a-b in FIG. 1.
Figure 8:
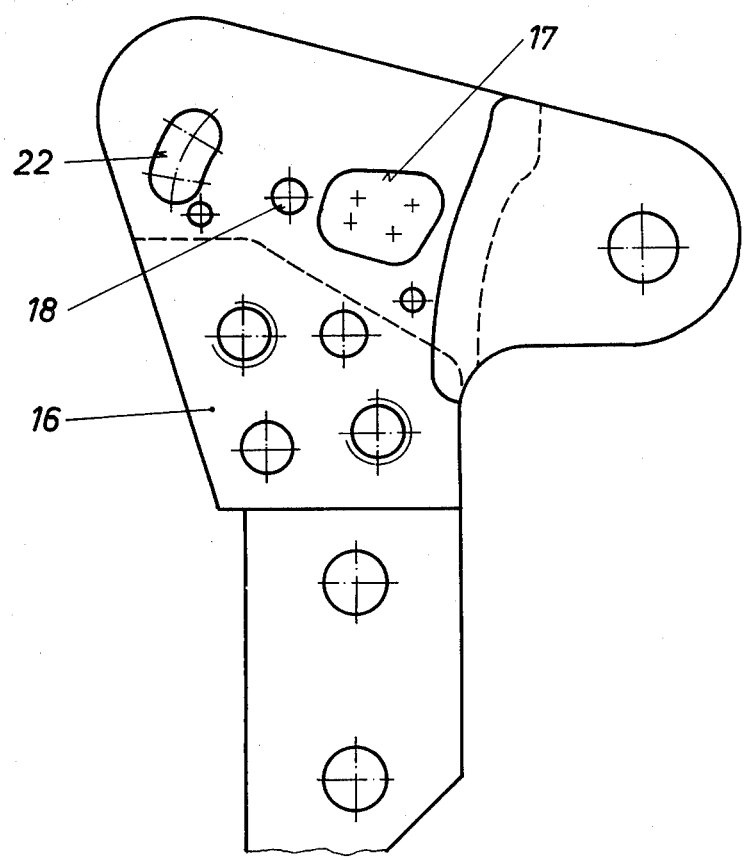
FIG. 8 shows a top view of the counter support plate seated on the fixed plier grip.

On the end of the fixed grip 1 is a fixed cutting jaw 5 and a counter support plate 16 partially covering that jaw and fastened to grip 1. The jaw 5 has an arc-shaped cutting edge 6 and forms at its outer end a trunnion bearing 7 for the pivotal plier jaw 8 which has the shape of a circular arc, with the cutting edge 9. As shown in FIG. 7, the pliers according to the invention are a so-called shear cutter where the two plier jaws 5 and 8 slide past each other during the cutting process with plane surfaces 5' and 8' and have cutting phases 6' and 9' on the sides not facing each other.

On its outer circumference, the movable cutting edge 8, which also is designated as pivot knife, is equipped with a gear tooth system 10 or constructed as gear segment in the form of a circular arc of radius R about pivot bearing 7.

On a trunnion 11 seated in the shear grip 2 pivots the shear lever 12 which engages, with its teeth 13 at the forward lever end, under the action of a spring 14, the teeth 10 of the pivot knife 8. On the topside of the pivot lever 12 there is a trunnion 15 which reaches upward through an opening 17 of the counter support plate 16.

In front of the shear lever 12, there is seated in the fixed plier grip on a trunnion 18 a stop lever 20, with a stop tooth 19, which also has a trunnion 21 reaching upwards through an opening 22 of the counter support plate 16. A spring 23 tends to have the stop lever 20 with its tooth 19 engage the teeth 10.

Shear grip 2 and shear lever 12 form a toggle lever drive in relation to gear segment 10, as shown in FIG. 5 by the heavy lines 2' and 12'. When pressing fixed grip 1 and shear grip 2 against the action of spring 4, the gear segment 8, 10 is moved about its pivot 7 by a certain amount. The stop lever 20 first runs over teeth 10. At the end of the pivot motion, the stop lever with its tooth 19 engages the gear segment and thus holds jaws 8 tight. When releasing shear grip 2, the latter, together with the shear lever 12, pivots back to its starting position, with the shear lever 12 with its teeth 13 traveling empty over the teeth of the gear segment.

The trunnions 15 and 21 on shear and stop lever project by a certain amount through and beyond the openings 17 and 22 of the counter support plate 16. An unlocking plate 25 is placed on the projecting trunnion ends. The plate is held by snap rings 24 placed on the trunnions. The unlocking plate 25 can be displaced against the action of springs 14 and 23. Thus disengagement of stop lever and shear lever from the gear segment 10 and hence release of pivot knife 8 can be achieved. Depending on whether the plate 25 (FIG. 3) is pulled back on its right or left side, either the shear lever 12 or the stop lever 20 can be withdrawn. Of course both levers can be disengaged jointly by means of unlocking plate 25.

On the rear side of the pliers a pawl 27 is mounted on a trunnion 26. This pawl can be detented in a recess of the fixed plier jaw 5 if the pliers are to be secured against unintentional operation. The shape of recess 28, in conjunction with the back of pawl 27, effects its opening when the plier grips are pressed together.

If the pliers according to the invention are to be used, the pivot knife 8 must be swung back to the position shown by broken lines in FIG. 1. If necessary, the locking by levers 12 and 20 must be released by pulling the unlocking plate 25. After turning the pivot knife 8 about its pivot trunnion 7, the workpiece W can be placed inside the fixed knife 5. Then follows the closing of the pivot knife 8 around the workpiece W, with the pivot knife being guided in a slot 29 provided between fixed grip 1 and counter support plate 16. The pivot knife 8 must be tilted forward till the gear segment 10 engages the shear lever 12, 12. Now, by continued alternating pressing together and releasing the plier grips 1 and 2, the pivot knife 8 is moved step by step by means of the gear segment 10 and the sliding drive consisting of levers 12 and 20.

This reduces the space L between the two knives 5 and 8. The workpiece W is split by the edges 6 and 9 of the two knives as soon as the space L has become zero or smaller.

After the splitting of the workpiece, the gear segment 10 and the pivot knife 3 can be released again by pulling the unlocking plate 25 and tilting to its starting position shown by broken lines in FIG. 1.

I claim:

1. Manually operated cutting pliers for cables, wires and profiles, comprising: two hinged plier grips spread apart by spring action; one of said plier grips having a fixed cutting jaw forming a workpiece support, said fixed cutting jaw having a free outer end, a second movable cutting jaw placeable about a workpiece and pivotally mounted at said free end, a closure drive actuated by another plier grip, said second jaw having teeth on the outside meshing with said closure drive after placement about the workpiece, said teeth comprising a gear segment with teeth located about a circular base abutted around the pivoted mounting of said second jaw, said closure drive comprising a toggle lever drive actuated by said movable jaw and extending into said gear segment; said jaws being movable relative to each other about a pivot point at ends facing away from ends of the plier grips.

2. Manually operated cutting pliers as defined in claim 1 wherein said movable second jaw comprising a clamp placed around a workpiece, said clamp during closure engaging said drive, said clamp upon actuation pinching and finally splitting a workpiece.

3. Manually guided cutting pliers as defined in claim 1 including a slot guide for said movable jaw on said plier grip having said fixed jaw.

4. Manually operated cutting pliers as defined in claim 1 including a pivot bearing; teeth of said gear segment being located on a circular arc centered around said pivot bearing and engaging said drive.

5. Manually operated cutting pliers as defined in claim 1 including plane surfaces and cutting phases, said jaws guiding each other along said plane surfaces, said cutting phases being ground on a side facing away from said plane surfaces, said pliers operating as a shear cutter.

6. Manually operated cutting pliers as defined in claim 4 including a shear lever, a spring and a stop lever as part of said drive, said shear lever being located on said plier grip actuating said movable jaw and engaging said gear segment, said stop lever being located on said plier grip having a fixed jaw, said spring causing said stop lever to engage said gear segment when said movable jaw plier grip swings back.

7. Manually operated cutting pliers as defined in claim 4 wherein one of said plier grips for actuating said movable jaw is spaced from said pivot bearing of said movable jaw on said one of said plier grips having a fixed jaw by a distance corresponding to the radius of the said gear segment.

8. Manually operated cutting pliers as defined in claim 6 wherein said shear lever with an upper end of said one of said plier grips for actuating said movable jaw forms a toggle-lever drive cooperating with said gear segment.

9. Manually operated cutting pliers for cables, wires and profiles, comprising: two hinged plier grips spread apart by spring action; one of said plier grips having a fixed jaw; a sliding drive; a movable jaw actuated relative to said fixed jaw by the other one of said plier grips via said sliding drive; at least one of said jaws having a cutting edge on a side facing another jaw, said jaws enclosing a workpiece for forming a closed gap, the width of said gap being reduced to zero by opening and closing said two plier grips; a gear segment on an outside of said movable jaw; a pivot bearing; teeth of said gear segment being located on a circular arc centered around said pivot bearing and engaging said sliding drive; a shear lever, a spring and a stop lever as part of said sliding drive, said shear lever being located on said plier grip actuating said movable jaw and engaging said gear segment, said stop lever being located on said plier grip having a fixed jaw, said spring causing said stop lever to engage said gear segment when said movable jaw plier grip swings back; a common unlocking slide engaging said shear lever and said stop lever.

* * * * *